United States Patent
Russell et al.

(10) Patent No.: US 10,127,554 B2
(45) Date of Patent: Nov. 13, 2018

(54) FRAUD EARLY WARNING SYSTEM AND METHOD

(75) Inventors: Thomas A. Russell, Babylon, NY (US); Albert S. Ludlam, West Babylon, NY (US); Gay Andrews, Long Island City, NY (US); Albert Huang, Lake Grove, NY (US)

(73) Assignee: Citibank, N.A., New York, NY (US)

( * ) Notice: Subject to any disclaimer, the term of this patent is extended or adjusted under 35 U.S.C. 154(b) by 1116 days.

(21) Appl. No.: 11/353,941

(22) Filed: Feb. 15, 2006

(65) Prior Publication Data

US 2007/0203826 A1   Aug. 30, 2007

(51) Int. Cl.
*G06Q 20/40* (2012.01)
*G06Q 40/02* (2012.01)

(52) U.S. Cl.
CPC ......... *G06Q 20/4016* (2013.01); *G06Q 20/40* (2013.01); *G06Q 40/025* (2013.01)

(58) Field of Classification Search
CPC ... G06Q 20/4016; G06Q 20/40; G06Q 40/025
See application file for complete search history.

(56) References Cited

U.S. PATENT DOCUMENTS

| | | | |
|---|---|---|---|
| 6,134,549 A * | 10/2000 | Regnier et al. | |
| 6,163,604 A * | 12/2000 | Baulier et al. | 379/189 |
| 6,330,546 B1 * | 12/2001 | Gopinathan et al. | 705/35 |
| 6,418,436 B1 * | 7/2002 | Degen et al. | 707/6 |
| 6,658,393 B1 * | 12/2003 | Basch et al. | 705/38 |
| 6,714,918 B2 * | 3/2004 | Hillmer et al. | 705/18 |
| 6,850,606 B2 * | 2/2005 | Lawyer et al. | 379/114.14 |
| 7,263,506 B2 * | 8/2007 | Lee et al. | 705/38 |
| 7,480,631 B1 * | 1/2009 | Merced et al. | 705/35 |
| 2003/0212904 A1 * | 11/2003 | Randle | G06Q 20/04 726/14 |
| 2004/0236696 A1 | 11/2004 | Aoki et al. | 705/50 |
| 2005/0015341 A1 * | 1/2005 | Jackson | G06Q 20/04 705/45 |
| 2007/0073519 A1 * | 3/2007 | Long | G06F 11/3636 702/185 |

FOREIGN PATENT DOCUMENTS

| | | | | |
|---|---|---|---|---|
| WO | WO 00/55784 | 9/2000 | ............ | G06F 17/60 |
| WO | WO 01/77959 | 10/2001 | ............ | G06F 17/60 |
| WO | WO 02/37219 | 5/2002 | | |
| WO | WO 07/041709 | 4/2007 | ............ | G06Q 40/00 |

OTHER PUBLICATIONS

Extended European Search Report for Application No. EP 07 10 2115, dated Jun. 20, 2007, 8 pp.

* cited by examiner

*Primary Examiner* — Asfand M Sheikh
(74) *Attorney, Agent, or Firm* — Eric L. Sophir; Dentons US LLP

(57) ABSTRACT

A fraud early warning system and method for monitoring transactional behavior of an account holder and evaluating that behavior by comparing it to biographical data and/or the past behavior of the account holder. The system and method is applicable to real-time wire transfers, online transactions, automated teller machine transactions, point-of-sale transactions, etc.

13 Claims, 5 Drawing Sheets

FRAUD EARLY WARNING SYSTEM AND METHOD

FIELD OF THE INVENTION

The present invention relates generally to a method and system for processing data. More particularly, but not by way of limitation, the present invention is a method and system for monitoring, detecting, and analyzing data inconsistencies or suspicious data. Even more particularly, the present invention is a method and system for monitoring, detecting, and analyzing fraudulent activities in financial transactions.

SUMMARY OF THE INVENTION

An embodiment of the present invention is a consolidated fraud early warning management system. A further embodiment is a system and process for monitoring transactional behavior of an account holder and evaluating that behavior by comparing it to biographical data and/or the past behavior of the account holder. The past behavior may include past transactions. A further embodiment identifies unusual transactional or purchasing patterns. With the addition of each transactional data stored in the database of an embodiment of the present invention, the system and process become more comprehensive.

A further embodiment of the present invention is a system and method for detecting fraud in electronic commerce. Another embodiment provides real-time or near real-time linkages to processes that involve comparisons to past behavior and/or biographical data, and event-based triggering to permit prospective, concurrent, or subsequent intervention in fraudulent activities. The communication between the front end software applications and centralized database or databases may occur in real-time, near real-time, or in batches. A further embodiment of the present invention is a comprehensive and unified system that provides management with the tools to better manage the processing of financial transactions and detect and prevent fraudulent activities.

A further embodiment of the present invention includes a method and system for gathering and analyzing demographic information. For example, a centralized database may be populated with information that is created in a common format but is received from different sources. The information may include the last time a customer requested a transaction card, changed an e-mail address, ordered a check book, logged onto an Internet banking site, etc. The present invention feeds this data into the fraud detection and analysis system. Therefore, when a customer conducts a financial transaction, that financial transaction is compared to the customer's past behavior before the system authorizes the transaction.

The method and system of the present invention is applicable to wire transactions, ATM withdrawals, point of sale transactions, debit card transactions, etc. In an embodiment, the type of financial transaction will dictate how that transaction is checked and analyzed. For example, for a wire transaction, an embodiment will utilize criteria, such as, the last time the customer changed his/her Internet address, the last time the customer sent out a wire, or whether the customer sent wires to a particular destination (person or place) before. For ATM transactions, an embodiment may utilize criteria, such as, does the customer normally make ATM withdrawals.

Other embodiments of the present invention include methods and systems for processing data. For example, the system may comprise a first database for storing a first datum regarding an entity, a receiving device for receiving a second datum regarding a transaction involving the entity, and a processor. The processor applies the second datum against at least one parameter, compares the first datum to the second datum, and categorizes the transaction. The categorizing of the transaction may comprise placing the transaction in a queue based on a weighted risk basis, and the first database may be an alerts database. The entity may be a customer of a financial institution. Further, the second datum may be enhanced with a third datum prior to the processor comparing of the first datum to the second datum. The third datum may comprise demographic information or information on past financial behavior. The at least one parameter may be a risk parameter. The system may further comprise a terminal wherein a user may access information regarding the status of the transaction, and the financial transaction may comprise a real-time wire transfer or an online transaction.

Although the present invention has been described in reference to financial transactions and the detection of fraudulent activity, the present invention may be embodied in other ways and used with other processes. Embodiments of the present invention may be useful in industries or processes where data needs to be checked with a historical database or certain parameters in order to detect anomalies.

The illustrative embodiments are mentioned not to limit or define the invention, but to provide examples to aid in the understanding thereof. Illustrative embodiments are discussed in the Detailed Description and further description of the invention is provided therein.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Figure 1:
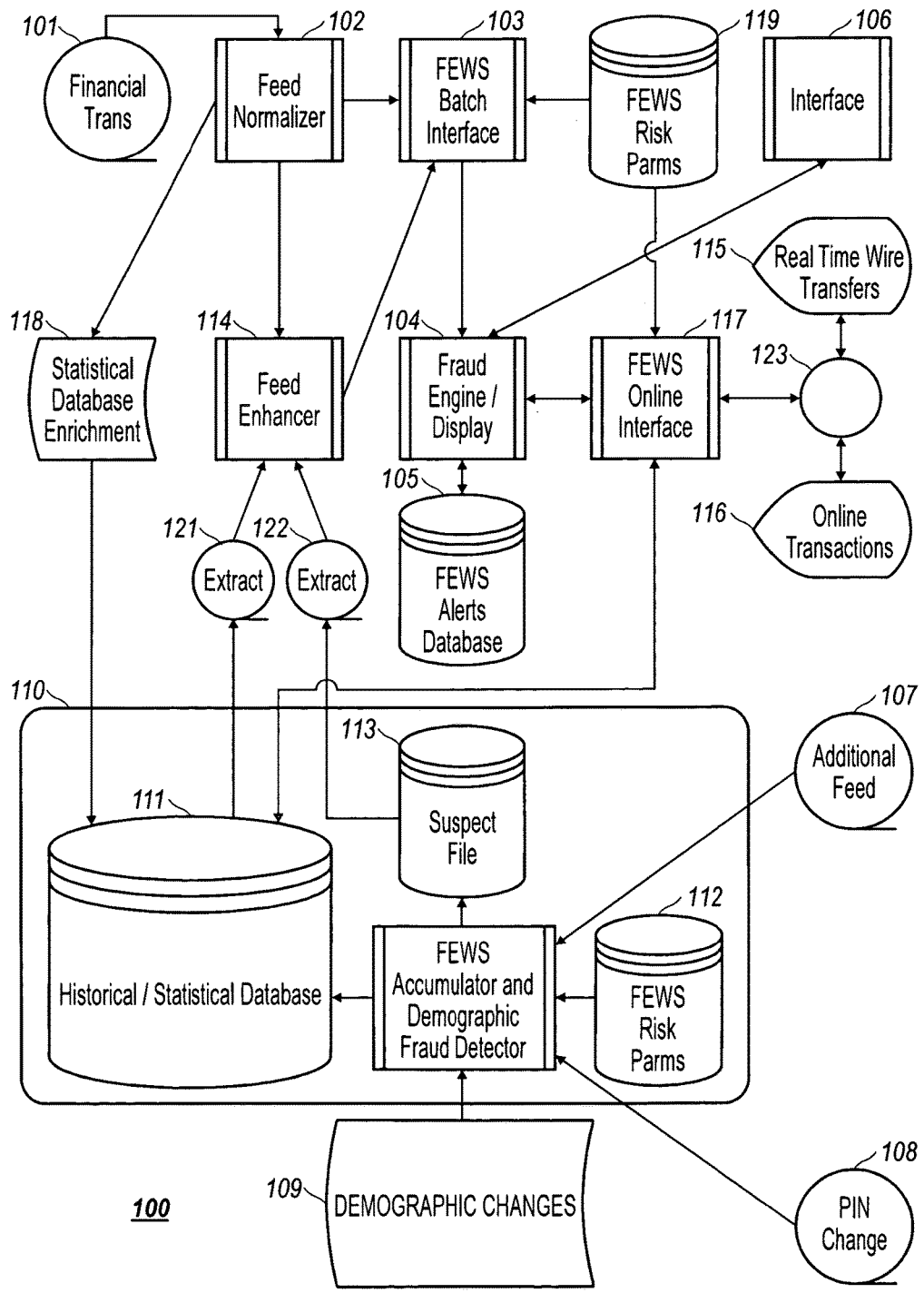
FIG. 1 illustrates a system diagram of an embodiment of the present invention.

Referring to FIG. 1, an embodiment 100 of the present invention receives financial transaction data 101 that, in this embodiment, represents basically machine-driven transactions, such as, on-us and off-us automated teller machine (ATM) transactions, signature-based debit transactions, point-of-sale (POS) transactions, etc. In these transactions, there is no customer/bank personnel interaction. The customer is transacting, for example, with a merchant or a machine. The transaction data may be transmitted in a variety of ways known to those skilled in the art. The transmission may be made, for example, via cable or wireless, such as, radio waves, infrared, etc. or through files stored on computer readable media, such as, computer disks, magnetic tape, etc. Further, the transmission may be real-time, near real-time or in batch loads, for example, in batches twelve times a day. For purposes of this discussion of the embodiment shown in FIG. 1, the transaction data is being transmitted in batch loads. This type of transaction data may come through an existing on-line authorizer system used, for example, for authorizing ATM and POS transactions. In this embodiment, the transaction data is fed into a feed normalizer 102 so that the data is in an appropriate, common format for further use.

In an embodiment, the transaction data may be sent directly from feed normalizer 102 to the Fraud Early Warning System (FEWS) batch interface 103. In another embodiment, rather than sending the data directly to the FEWS batch interface 103, the data is first sent to a feed enhancer 114 (further described below) before being sent to the FEWS batch interface 103. At the FEWS batch interface 103, risk parameters for the machine-driven transactions stored in a FEWS risk parameters database 119 and are associated with the transaction data such that the FEWS fraud engine/display 104 can, for example, place individual transactions in queues based on a weighted risk basis or otherwise identify and/or categorize transactions that deserve attention. For example, if there is a particularly suspicious transaction, that data will be placed in a high priority queue for immediate review, for example by a human analyst. If the transaction is placed on a low priority queue, the transaction may not be reviewed but rather the data may be stored for later review if warranted. A FEWS alerts database 105 is operatively coupled to the FEWS fraud engine/display 104 and is able to store details, for example, regarding prior transactions, as well as, details regarding possible future fraudulent activity that can be accessed by the FEWS fraud engine/display 104.

In a further embodiment, there is an interface 106 that permits an individual reviewing transactions to "hot key" into a current customer service application. For example, an analyst may immediately gain access to the transaction data of interest, as well as, other information maintained by the system 100.

An embodiment of the present invention provides for additional inputs for monitoring, detecting, and analyzing fraudulent activity. These inputs include personal identification number (PIN) change data 108 and demographic change data 109 data. The data may be received, for example, in batch feeds. Information in the PIN change feed includes, for example, the last time a customer burned away his/her PIN because of too many incorrect attempts. The demographic change feed includes, for example, address changes, phone number changes, e-mail changes, various investigations conducted, mis-dispensed claims, etc. The invention contemplates additional feeds 107, for example, batch feeds for various other information that may become available.

The PIN change 108, demographic change 109, and additional feeds 107 are directed to a segment of the system 100 that may be referred to as the data analysis engine 110.

Associated with the data analysis engine 110 is a historical/statistical database 111 that includes a variety of monthly accumulators, weekly accumulators, wire transfer history, etc., as well as, daily transactional information. In an embodiment, the historical/statistical database 111 is populated with a statistical database enrichment file 118 from the feed normalizer 102 after the feed normalizer 102 receives the financial transaction data. Also associated with the data analysis engine 110 is FEWS risk parameter database 112, a FEWS accumulator and demographic fraud detector 120, and a suspect file 113. The FEWS accumulator and demographic fraud detector 120 applies risk parameters from the FEWS risk parameters database 112 against this the PIN change data 108 and the demographic change data 109. In an embodiment, the FEWS risk parameters database 112 comprises risk parameters pertinent to PIN change 108 and demographic change data 109. What results is a suspect file 113 containing transactions or accounts that have a suspicious amount of activity, however defined, against them. An extract 122 of that suspect file 113 is then directed to the feed enhancer 114 (see above). The FEWS accumulator and demographic fraud detector 120 also populates the historical/statistical database 111 with data. There is an extract 121 of the historical/statistical database 111 that is also directed to the feed enhancer 114.

A reason for the data flow from the extract 122 of suspect file 113 and the extract 121 from the historical/statistical database 111 is to have more information compared to the incoming financial transaction 101. The additional information, for example, from demographic changes 109, makes more sophisticated the attempt to identify how risky a particular transaction may be. For example, a withdrawal in Romania may be suspect unless the customer has been making withdrawals there and not placing claims.

Still referring to FIG. 1, an embodiment also includes a feed of real time wire transfers 115 and online transactions 116 which are integrated 123 into the system 100 and inputted into the FEWS online interface 117. The FEWS online interface 117 takes the real time wire transfer data 115 and online transaction data 116 and associates that data to the data from the historical/statistical database 111 (see above). The FEWS online interface 117 also populates the historical/statistical database 111 with data from the real time wire transfers 115 and online transactions 116. Risk parameters from the FEWS risk parameters 119 (see above) are also supplied to the FEWS online interface 117. The fraud engine/display 104 then determines, for example, whether a particular customer sent wires out before, has the customer sent wires to the particular address before, and/or has the customer gone on record as saying that these are wires that he/she will make.

An alternative criteria may be applied to point out whether a particular wire transfer is a high risk wire transfer. For example, the criteria may be whether the customer had an e-mail change within the last two weeks, whether the customer had an address change or checkbook change, and/or whether this is the customer's first time for conducting a wire transfer. Based on the criteria, the fraud engine/display 104 determines whether the transfer should be placed on a high priority queue or, alternatively, the processing of that transfer should be suspended and/or rejected.

The embodiment 100 illustrated in FIG. 1 is a unified and/or consolidated system. Often the monitoring of financial transactions for fraudulent activity involve the use of multiple software applications and subsystems. Examples of disparate software applications and subsystems include those directed to ATM transactions, on the one hand, and online financial transactions, on the other.

Human review may be involved rather than an automatic suspension or rejection of, for example, a wire transfer. The present invention provides the capability to do both or either depending on the circumstances. Human intervention may be desired as a way to help avoid unintended negative reaction of a customer.

Further embodiments of the present invention are presented below. To the extent that common elements for various embodiments are identified, their descriptions will not be repeated for each embodiment.

Figure 2:
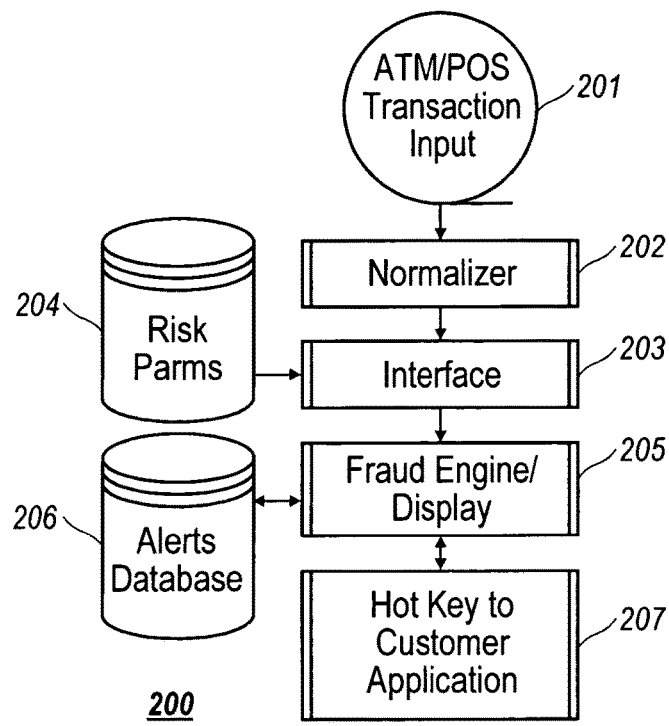
FIG. 2 illustrates a system diagram of a further embodiment of the present invention.

In the embodiment depicted in FIG. 2, machine-driven transactional data 201 is received by the system 200 from, for example, an ATM. The transactional data 201 may be fed to a normalizer 202. The data is then fed to an interface 203 where risk parameters 204 are associated with the transactional data 201. A fraud engine 205 then identifies and/or categorizes transactions that may be suspicious or otherwise should receive attention. An alerts database 206 is operatively coupled to the fraud engine 205 and is able to store details regarding prior transactions, as well as, details regarding possible future fraudulent activity that can be accessed by the fraud engine 205. The system 200 may also provide an interface 207 for hot keying to a customer application. Note that the direction of information flow as illustrated by the arrows in FIG. 2 may be to and from the fraud engine 205, alerts database 206, and the hot key to customer application 207.

Figure 3:
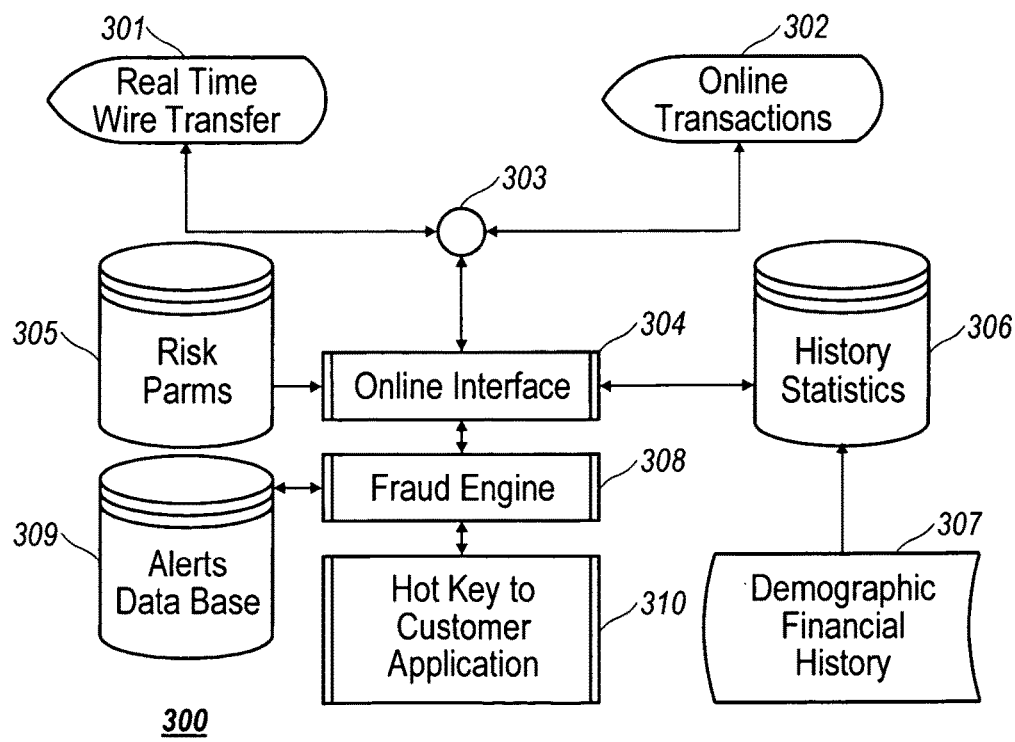
FIG. 3 illustrates a system diagram of another embodiment of the present invention.

FIG. 3 illustrates an embodiment whereby real time wire transfer data 301 and/or online transaction data 302 are integrated 303 into the system 300 and fed to an online interface 304. The online interface 304 may associate the data 301, 302 with data from a historical/statistical database 306. The historical/statistical database 306 may be populated with demographic changes and financial history 307, such as address changes, financial investigations conducted, etc. Risk parameters 305 are provided to the online interface 304. Further, the online interface 304 may also populate the historical/statistical database 306. The fraud engine 308 identifies and/or categorizes transactions that may be suspicious or otherwise should receive attention. An alerts database 309 is operatively coupled to the fraud engine 308 and is able to store details regarding prior transactions, as well as, details regarding possible future fraudulent activity that can be accessed by the fraud engine 308. The system 300 may also provide an interface 310 for hot keying to a customer application. Note that the direction of information flow as illustrated by the arrows in FIG. 3 may be to and from the interface 304, the real time wire transfer 301, the online transactions 302, the fraud engine 308, historical/statistical database 306, alerts database 309, and the hot key to customer application 310.

Figure 4:
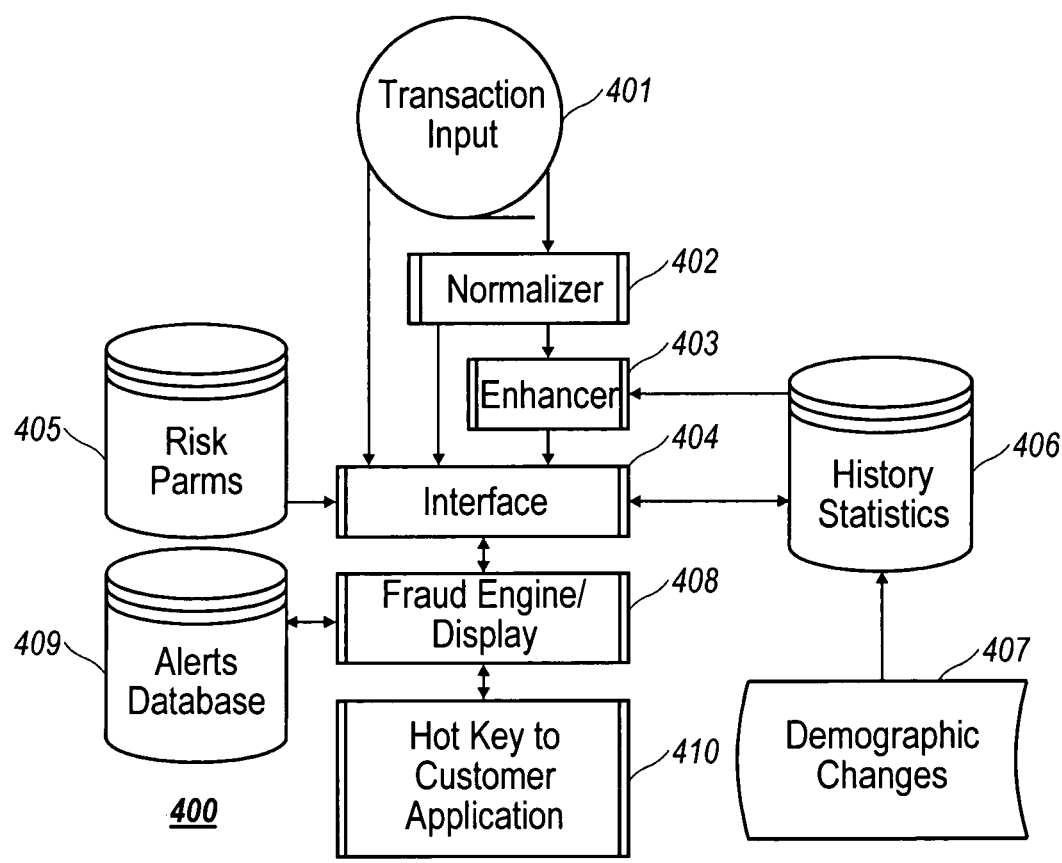
FIG. 4 illustrates a system diagram of a further embodiment of the present invention.

FIG. 4 illustrates a further embodiment of the present invention. In this embodiment, the system 400 includes any type of data received from any variety of sources. The data may be, for example, data pertaining to financial transactions 401. The transactional data may be fed through a normalizer 402 and the transactional data may also be enhanced via an enhancer 403 that may include any variety of information such as historical, statistical, and/or demographic information. The information may further include information related to conducting financial transactions, such as PIN changes, risk parameters, etc.

The interface 404 may associate the data 401 with data from a historical/statistical database 406. The historical/statistical database 406 may be populated with demographic changes and financial history 407, such as address changes, financial investigations conducted, etc. Risk parameters 405 are supplied to the interface 404. Further, the interface 404 may also populate the historical/statistical database 406. The fraud engine 408 identifies and/or categorizes transactions that may be suspicious or otherwise should receive attention. An alerts database 409 is operatively coupled to the fraud engine 408 and is able to store details regarding prior transactions, as well as, details regarding possible future fraudulent activity that can be accessed by the fraud engine 408. The system 400 may also provide an interface 410 for hot keying to a customer application. Note that the direction of information flow as illustrated by the arrows in FIG. 4 may be to and from the interface 404, the fraud engine 408, historical/statistical database 406, alerts database 409, and the hot key to customer application 410.

Figure 5:
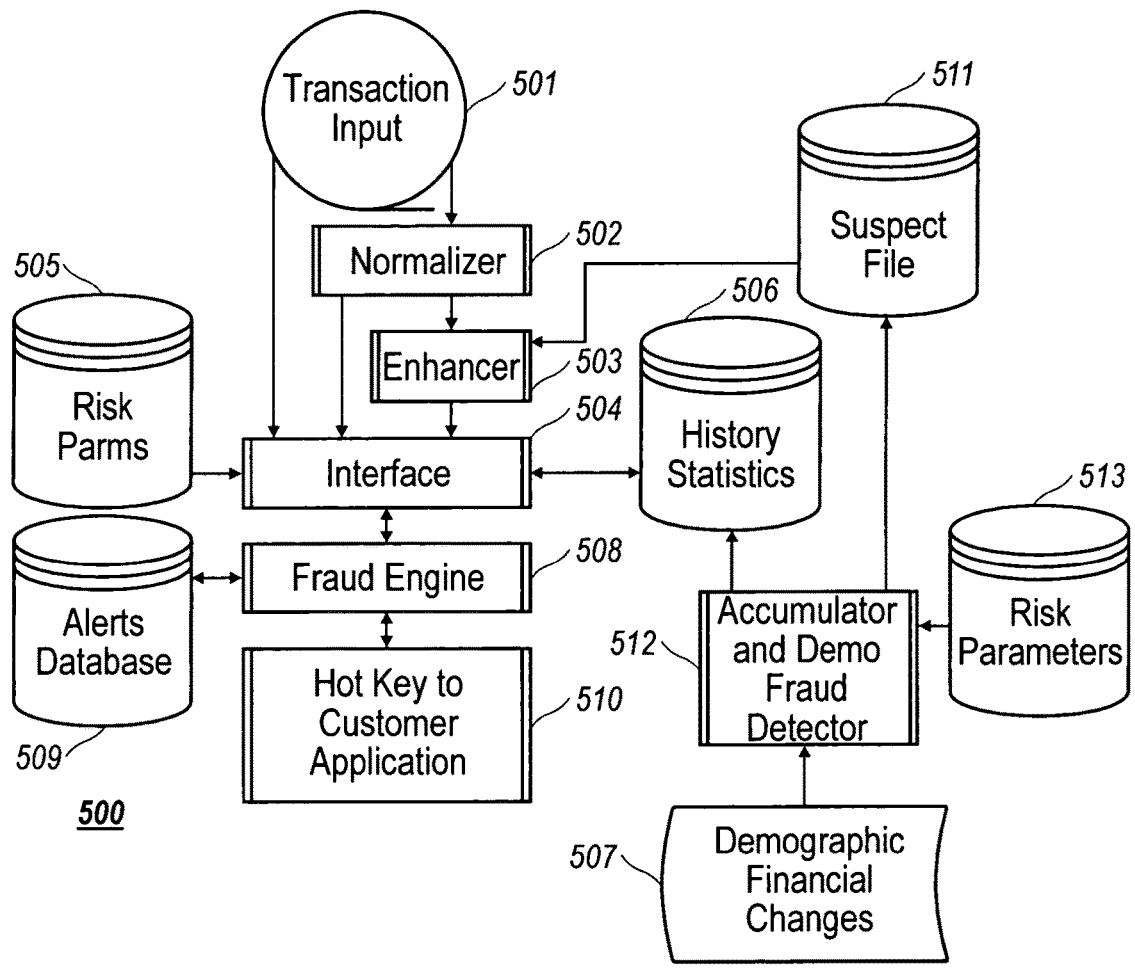
FIG. 5 illustrates a system diagram of yet another embodiment of the present invention.

The embodiment illustrated in FIG. 5 is similar to that in FIG. 4; however, an accumulator and demographic fraud detector 512 populates the historical/statistical database 506. The accumulator and demographic fraud detector 512 applies risk parameters from a risk parameters database 513 to data from a file 507 comprising demographic changes, financial history, etc. A suspect file results 511 results which contains, for example, transactions or accounts that have suspicious amount of activity, however defined. Data from the suspect file 511 may then be directed to the feed enhancer 503.

Figure 6:
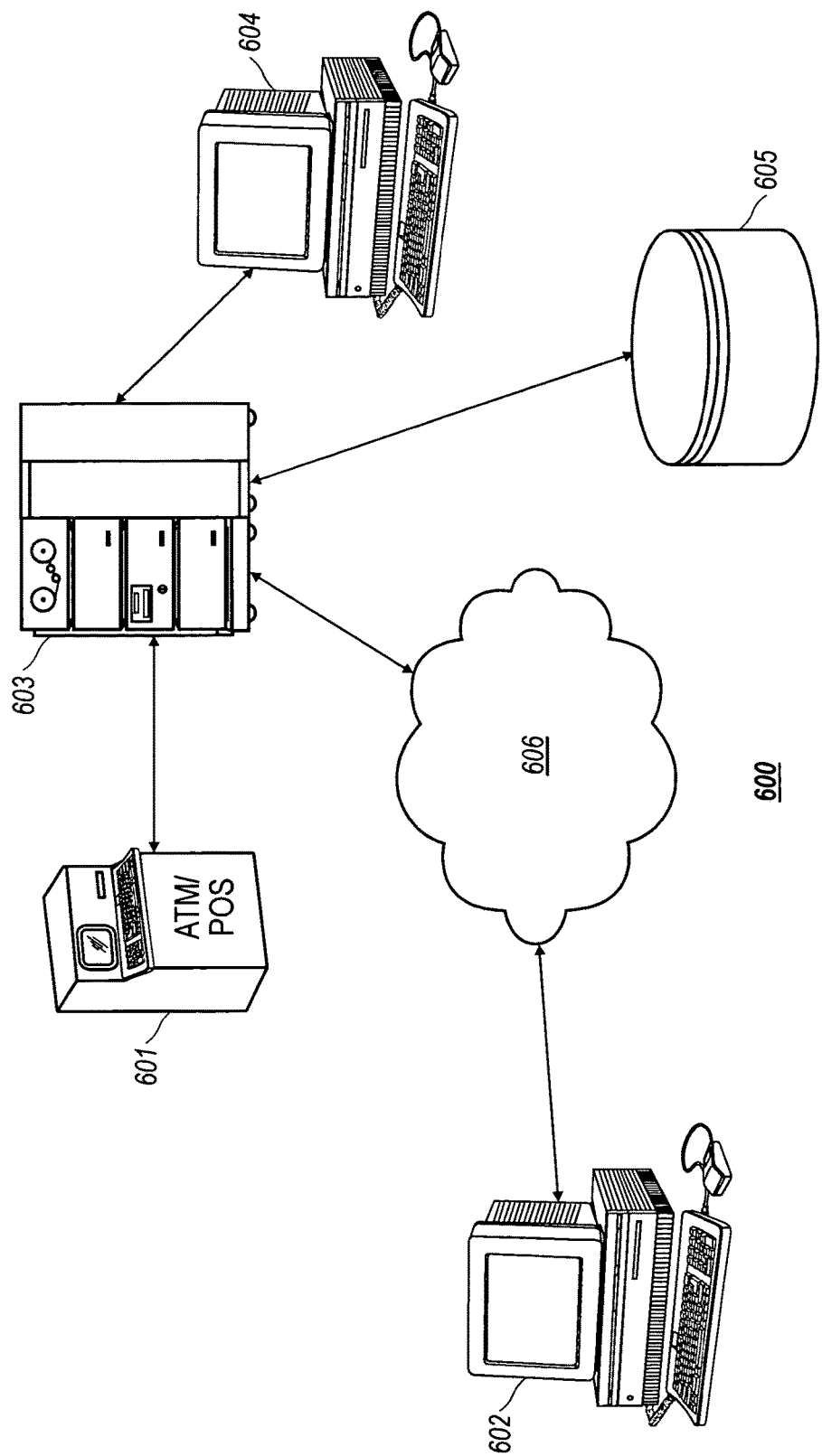
FIG. 6 illustrates a system architecture of an embodiment of the present invention.

A basic system architecture of an embodiment of the fraud monitoring, detection, and analysis system of the present invention is illustrated in FIG. 6. FIG. 6 is intended as illustrative example of a data processing system 600 that comprises computers linked by a communications network. In FIG. 6, a terminal 601, such as an automated teller machine (ATM) or a point-of-sale (POS) terminal is operatively connected to a server 603 via a communications network. In other embodiments, information from an ATM or POS terminal may be transferred to the server 603 by physical methods rather than through a communications network. Additionally, data transfers throughout the system 600 may be transferred in batches or in real-time, or near real-time.

The server 603 has a processor and memory. Also linked to the server 603 via a communications network, such as the Internet 606, is second terminal, such as a personal computer 602 through which online transactions may be conducted. The server 603 is operatively coupled to a database 605. The database 605 may reside on the server 603 or may be coupled to the server 603 via a communications network. Also coupled to the server 603 is a third terminal 604 that can serve as an input/output and display device. The terminal 604 may interface with the server 603 to provide information to an analyst or other user. The present invention may include additional servers, databases, terminals, and other additional hardware and software in a manner known to those skilled in the art.

The database 605 may comprise data structure with specific fields that correspond, for example, to biographical information about a customer, risk parameters established for financial transactions, and/or historical records regarding past activity, including past transactions. The database 605 may be queried by a fraud analyst at a terminal 604 to extract information relating to a transaction. Additionally, the data processing system 600 comprises software having instructions for implementing an embodiment of a method of the present invention. The instructions may comprise code from any computer programming language.

Embodiments of the present invention have now been described in fulfillment of the above objects. It will be appreciated that these examples are merely illustrative of the invention. Many variations and modifications will be apparent to those skilled in the art.

The invention claimed is:

1. A computer implemented method for prevention of fraudulent activities in online transactions, comprising the steps of:
    receiving, by a fraud engine server via an online interface, from a terminal selected from a group consisting of an automated teller machine (ATM) or a point-of-sale (POS) terminal of an entity associated with a customer, online machine-driven transaction data in a first format for transfer authorization of a real time online transaction at the terminal,
        wherein the online machine-driven transaction data is associated with the real time online transaction, and identifies the customer associated with the entity, a location of the terminal, and a time of the real time online transaction;
    generating, by a feed normalizer of the fraud engine server, based upon the online machine-driven transaction data, normalized online transaction data having a second format compatible with the fraud engine server, wherein the first format is configured for the ATM or POS terminal, and the second format is configured for the fraud engine server;
    generating, by the fraud engine server, a queue comprising each transaction from the ATM or POS terminal, wherein the queue has a prioritization of transactions using a weighted risk basis;
    for each transaction in the queue;
    identifying, by the fraud engine server, in a database storing historical transaction data of one or more customers, the historical transaction data of the customer indicated by the online machine-driven transaction data, wherein the historical transaction history data contains financial records of the customer and one or more requests for changes to demographic data of the customer;
    extracting, by the fraud engine server, into an extract file from the database the historical transaction history of the customer purportedly associated with the entity, and the online machine-driven transaction data associated with the real time online transaction;
    determining, by the fraud engine server, based upon the extract file, at least one risk parameter to generate a weighting for the at least one risk parameter, the at least one risk parameter corresponding to a datum in the extract file including one or more requests for changes to demographic data of the customer that is identified as being associated with a higher risk;
    upon determining, by the fraud engine server, that the entity corresponds to the customer, based upon the weighting of each of the datum in the extract file corresponding to each of the at least one risk parameter, wherein at least one datum in the online machine-driven transaction data corresponds to demographic information associated with customer:
        transmitting, by the fraud engine server, the online machine-driven transaction data and an instruction for transfer authorization to the ATM or POS terminal and to an interface of a third computer configured to display a status of one or more online transactions and executing the real-time online transaction in real-time at the ATM or POS terminal; and
    upon determining, by the fraud engine server, that the entity fails to correspond to the customer:
        transmitting, by the fraud engine server, the online machine-driven transaction data for display on an interface of a fourth computer comprising a suspicious transaction queue and configured to display the online machine-driven transaction data of one or more online transactions via a graphical user interface; and
    transmitting, by the fraud engine server, to the terminal an alert comprising an instruction for rejecting the transfer authorization of the real time online transaction.

2. The method of claim 1 wherein the entity is a customer of a financial institution.

3. The method of claim 1 wherein the at least one risk parameter is associated with the risk that a particular transaction is fraudulent.

4. The method of claim 1 further comprising providing a user access to information regarding the status of the transaction.

5. The method of claim 1 wherein the third datum relates to at least one financial transaction.

6. The method of claim 5 wherein the at least one financial transaction comprises a real-time wire transfer or an online transaction.

7. A computer system for processing data to prevent fraud in online transactions, comprising:
    a first database configured to store demographic information for a customer associated with an entity;
    a second database configured to store transactional history data of the customer associated with the entity, wherein the transactional history data contains financial records of the customer and one or more changes to the demographic information of the customer stored in the first database; and
    a fraud engine server comprising a processor, wherein the processor of the fraud engine server is configured to:
        receive from a terminal selected from a group consisting of an automated teller machine (ATM) or a point-of-sale (POS) terminal of the entity associated with the customer, online machine-driven transaction data in a first format for transfer authorization of a real time online transaction at the terminal, the online machine-driven transaction data associated with the real time online transaction, and identifies the customer associated with the entity, a location of the terminal, and a time of the real time online transaction;
        generate, by a feed normalizer of the fraud engine server, based upon the online machine-driven transaction data, normalized online transaction data having a second format compatible with the fraud engine server, wherein the first format is configured for the ATM or POS terminal, and the second format is configured for the fraud engine server;
        generate a queue comprising each transaction from the ATM or POS terminal, wherein the queue has a prioritization of transactions using a weighted risk basis;
        for each transaction in the queue:
        extract, into an extract file, from the second database, the transactional history data of the customer associated with the entity and the online machine-driven transaction data associated with the real time online transaction;
        determine based upon the extract file at least one risk parameter to generate a weighting for the at least one risk parameter, the at least one risk parameter corresponding to a datum in the extract file including one or more requests for changes to demographic data of the customer that is identified as being associated with a higher risk;

upon determining that the entity corresponds to the customer, based upon the weighting of each of the datum in the extract file corresponding to each of the at least one risk parameter, wherein at least one datum in the online machine-driven transaction data corresponds to demographic information associated with customer:

execute in real-time the online transaction at the ATM or POS terminal and transmit the online transaction data and an instruction for transfer authorization to the ATM or POS terminal and to an interface of a first computer to display a status of one or more online transactions; and upon determining, by the fraud engine server, that the entity fails to correspond to the customer:

transmit the online transaction data to an interface of a second computer comprising a transaction queue and configured to display the online transaction data of one or more online transactions via a graphical user interface; and transmit to the terminal an alert comprising a real-time instruction for rejecting the transfer authorization of the online transaction.

8. The system of claim 7 wherein the second database is an alerts database for storing information regarding prior transactions.

9. The system of claim 7 wherein the entity is a customer of a financial institution.

10. The system of claim 7 wherein the at least one risk parameter is associated with the risk that a particular transaction is fraudulent.

11. The system of claim 7 further comprising a terminal wherein a user may access information regarding the status of the transaction.

12. The system of claim 7 wherein the third datum relates to at least one financial transaction.

13. The system of claim 12 wherein the at least one financial transaction comprises a real-time wire transfer or an online transaction.

* * * * *